(12) United States Patent
Cheng et al.

(10) Patent No.: US 7,512,417 B2
(45) Date of Patent: Mar. 31, 2009

(54) WIRELESS ELECTRONIC DEVICE WITH RETRACTABLE EARPHONES

(75) Inventors: Miriam Cheng, Taipei (TW); Beniz Wang, Taipei (TW)

(73) Assignee: Inventec Corporation, Taipei (TW)

( * ) Notice: Subject to any disclaimer, the term of this patent is extended or adjusted under 35 U.S.C. 154(b) by 545 days.

(21) Appl. No.: 11/328,053

(22) Filed: Jan. 10, 2006

(65) Prior Publication Data

US 2007/0161403 A1 Jul. 12, 2007

(51) Int. Cl.
*H04B 1/38* (2006.01)
*H04M 1/00* (2006.01)

(52) U.S. Cl. .................. 455/557; 455/556.1; 455/575.6; 455/569.1; 455/575.1; 379/420.02; 379/420.03; 379/420.04

(58) Field of Classification Search ................. 455/557, 455/556.1, 575.1, 575.6, 66.1, 556.01, 569.1, 455/90.3; 379/420.02, 420.03, 420.04

See application file for complete search history.

(56) References Cited

U.S. PATENT DOCUMENTS

2006/0030360 A1* 2/2006 Yeh ............................. 455/557
2006/0185062 A1* 8/2006 Peng et al. .................. 2/209.13

* cited by examiner

*Primary Examiner*—Tuan A Pham
(74) *Attorney, Agent, or Firm*—Bacon & Thomas, PLLC

(57) ABSTRACT

The present invention is to provide a wireless electronic device comprising a main body and an earphone assembly being retractably disposed in the main body with two ends provided at one side of the main body capable of being pulled outward and a cable portion between the two ends adapted to extend through the other side of the main body to form an enclosed loop. By utilizing this wireless electronic device, a user may put the loop of the earphone assembly on a hook of wall or on the neck for hanging the electronic device, and may also pull speakers respectively disposed at the ends of the earphone assembly out of the main body and put the speakers into the ears for listening.

4 Claims, 4 Drawing Sheets

WIRELESS ELECTRONIC DEVICE WITH RETRACTABLE EARPHONES

FIELD OF THE INVENTION

The present invention relates to wireless electronic devices, and more particularly to such a wireless electronic device having an earphone assembly being retractably disposed in a main body with two ends provided at one side of the main body capable of being pulled outward and a cable portion between the two ends adapted to extend through the other side of the main body to form an enclosed loop.

BACKGROUND OF THE INVENTION

Technology has known a rapid, spectacular development in these several decades. A wide variety of advanced electronic products are available and are widely used by people, resulting in a significant improvement of living quality. For example, the availability of mobile phones enables a person to use a mobile phone to communicate with a distant person using a typical wire telephone (or mobile phone) in any time any place by taking advantage of the advanced wireless communication technology. Unit price of a mobile phone is reduced greatly as a result of great investment in research and development by major manufacturers of the art and mass production. Further, it is found that one type of mobile phone available from one manufacturer has some identical features as that produced by another manufacturer. That is, they are compatible in general. The trend of developing mobile phones is slimness, compactness, and lightweight in consideration of weight and size. Further, an all-in-one mobile phone is constantly being sought. Advantageously, they are gaining popularity among vast consumers.

Conventionally, an electronic product provides features to satisfy specific needs. Further, it has entertainment features in order to meet additional needs. Thus, these electronic products have become a ubiquitous tool for both personal and work related tasks. Nowadays almost every adult has a mobile phone. A mobile phone not only can be used as means for communication but also can be used to send short messages, receive or send e-mails. Moreover, a mobile phone-can be conveniently used as radio to listen to FM or AM program. In addition, MP3 (Motion Picture Expert Groups, layer 3) feature is added to many new types of mobile phone. Thus, a person may use the MP3 feature of his or her mobile phone to listen to music or radio by wearing a pair of earphones. This is particularly beneficial to commuters since a commuter may use the MP3 feature of his or her mobile phone to relax or even kill time during the relatively long, dull period of time of commutation by bus or train in rush hours of the morning or the evening.

A typical mobile phone capable of listening to radio or music played by MP3 is shown in FIG. 1. As shown, a plug 10 at one end of an earphone device 1 is fitted into a port of a mobile phone 2. As such, a mobile phone user may use the MP3 feature to listen to music or radio in any time any place. A mobile phone having MP3 feature is thus a good means for entertainment and killing time. As such, such type of mobile phone 2 is gaining popularity among vast consumers. However, a user may be at a loss in properly disposing cable 12 and a pair of independent speakers 14 of the earphone device 1 when the mobile phone is not used. There are several techniques currently available for disposing the earphone device 1 when the mobile phone is not used. Unfortunately, neither of them is convenient. One technique is that a user may wrap the cable 12 around the mobile phone 2. However, it may inhibit a mobile phone user from answering an incoming call in time. Another technique is that a mobile phone user may detach the earphone device 1 to put the cable 12 into a briefcase or cloth pocket. However, it may cause the cable 12 to be entangled therein. Moreover, either above technique may easily cause the speaker(s) 14 to disengage with the cable 12 or even damage same. This really bothers mobile phone users a lot. Thus, a need for improvement exists.

SUMMARY OF THE INVENTION

After considerable research and experimentation, a wireless electronic device having an earphone assembly including two retractable speakers according to the present invention has been devised so as to overcome the above drawbacks of the prior art.

It is an object of the present invention to provide a wireless electronic device comprising a main body and an earphone assembly being retractably disposed in the main body with two ends provided at one side of the main body capable of being pulled outward and a cable portion between the two ends adapted to extend through the other side of the main body to form an enclosed loop. By utilizing this wireless electronic device, a user may put the loop of the earphone assembly on a hook of wall or on the neck for hanging the electronic device, and may also pull speakers respectively disposed at the ends of the earphone assembly out of the main body and put the speakers into the ears for listening.

The above and other objects, features and advantages of the present invention will become apparent from the following detailed description taken with the accompanying drawings.

DETAILED DESCRIPTION OF THE PREFERRED EMBODIMENTS

Figure 1:
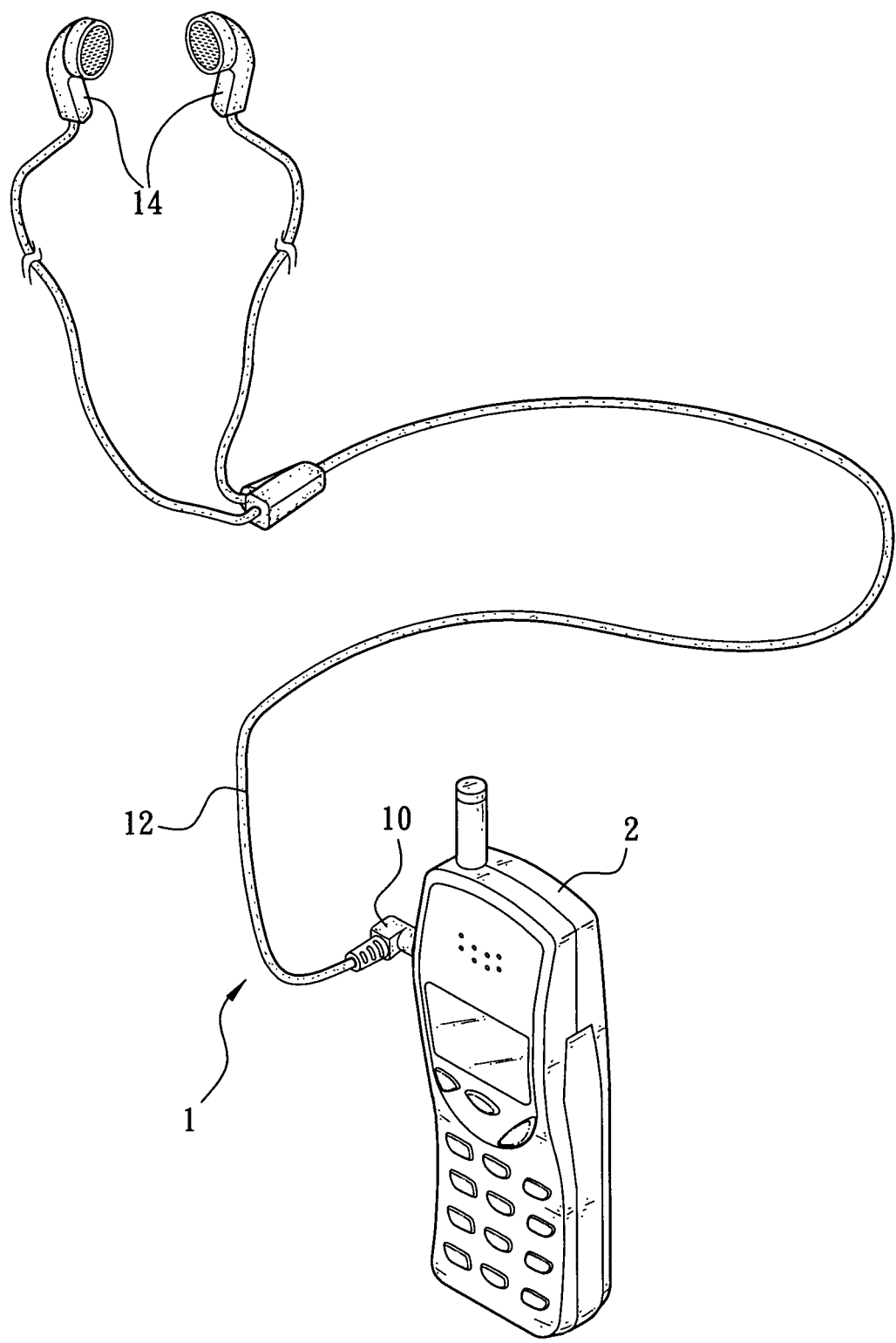
FIG. 1 is a perspective view of conventional dual earphones attached to a mobile phone.
Figure 2:
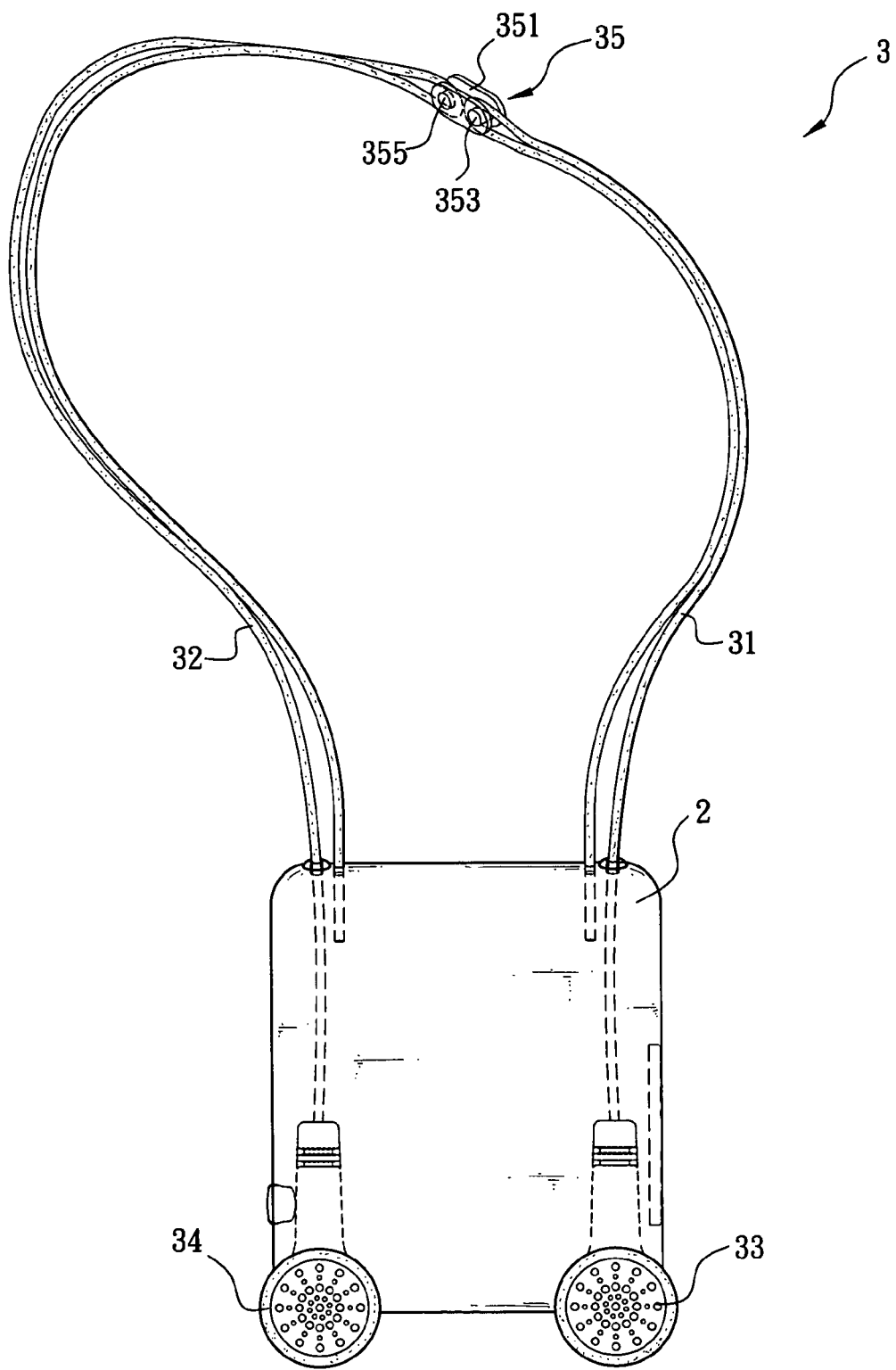
FIG. 2 is a perspective view of a preferred embodiment of wireless electronic device with an earphone assembly according to the invention where two speakers of the earphone assembly are retracted.
Figure 3:
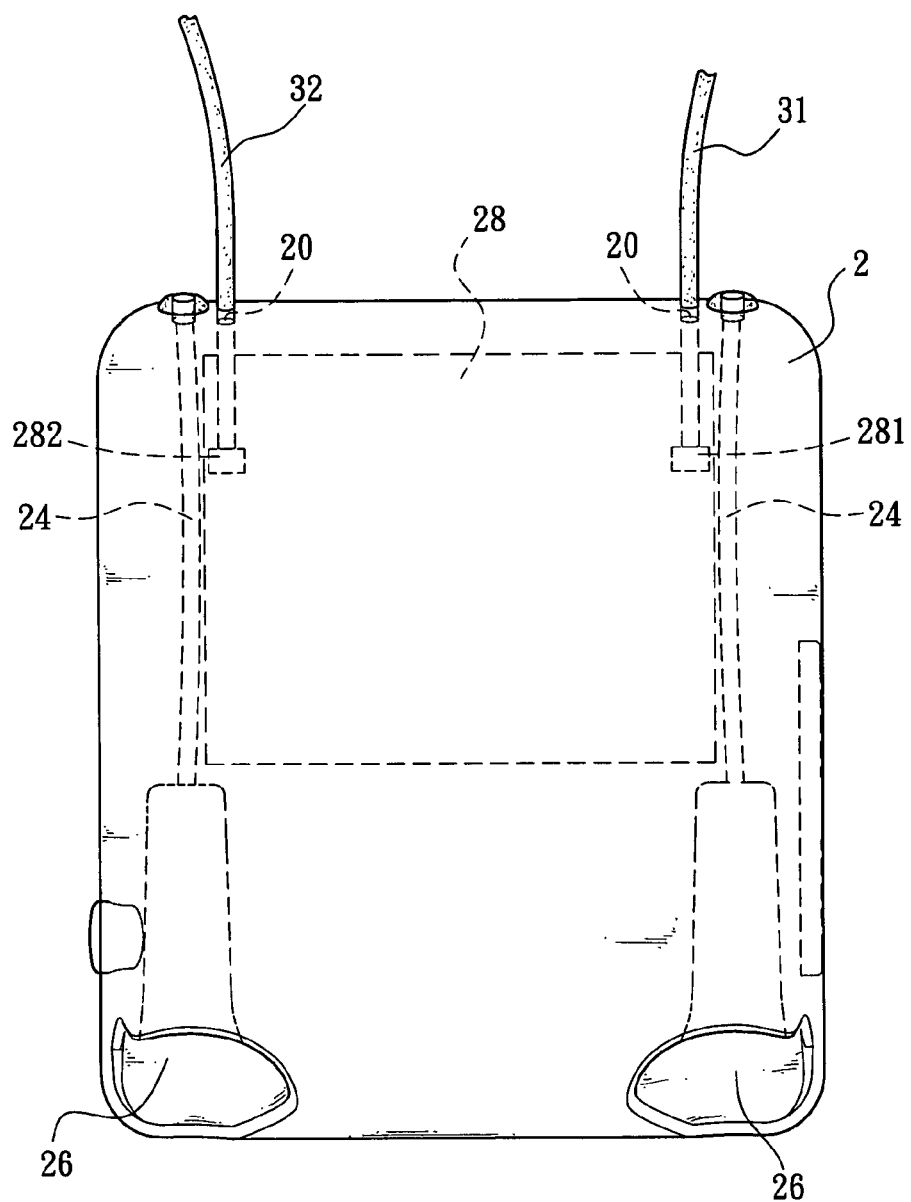
FIG. 3 is a perspective view of the electronic device.

Referring to FIGS. 2 and 3, a wireless electronic device with an earphone assembly in accordance with a preferred embodiment of the invention is shown. The preferred embodiment comprises a parallelepiped main body 2 and an earphone assembly 3 retractably disposed in the main body 2. The earphone assembly 3 has two ends provided at both bottom corners of the main body 2. Both ends of the earphone assembly 3 are adapted to pull out of both bottom corners of the main body 2 for enabling a user to listen to music or radio by putting both ends of the earphone assembly 3 into the ears. Cable portion between both ends of the earphone assembly 3 extends from one end of the earphone assembly 3 through the other side of the main body 2 to further extend beyond one top corner of the main body 2 to enter the other top corner thereof and thus form an enclosed loop. Finally, the cable portion passes the other side of the main body 2 to terminate at the other end of the earphone assembly 3. In use, a user may put the loop of the earphone assembly 3 on a hook of wall or on the neck for hanging the electronic device. This thus does not need to wrap earphone cable around a mobile phone or detach the earphone assembly as experienced in the prior art. As a result, it is possible of preventing the earphone assembly 3 from being disengaged or even damaged.

Referring to FIG. 3 again, in the preferred embodiment of the invention the main body 2 comprises two longitudinal grooves 24 along both sides and two cavities 26 provided at lower other ends of the grooves 24 (i.e., at the bottom corners of the main body 2). Cable portion of the earphone assembly 3 is adapted to pass the grooves 24. The lower other ends of the grooves 24 are attached to one ends of the cavities 26. The other ends of the cavities 26 are terminated at the bottom corners of the main body 2. The cavities 26 are adapted to receive both ends of the earphone assembly 3. Thus, the earphone assembly 3 is protected.

Referring to FIGS. 2 and 3 again, in the preferred embodiment the earphone assembly 3 comprises a right first cable 31, a right first speaker 33, a left second cable 32, a left second speaker 34, and an intermediate wheel assembly 35. One end of the first cable 31 is fastened in the main body 2 and the other end thereof is extended to wrap around a right axis of the wheel assembly 35, return to right top corner of the main body 2, pass the right groove 24, and finally terminate at the right cavity 26. One end of the second cable 32 is fastened in the main body 2 and the other end thereof is extended to wrap around a left axis of the wheel assembly 35, return to left top corner of the main body 2, pass the left groove 24, and finally terminate at the left cavity 26. One end of the first speaker 33 is attached to the other end of the first cable 31. The first speaker 33 is adapted to extend from the right cavity 26. One end of the second speaker 34 is attached to the other end of the second cable 32. The second speaker 34 is adapted to extend from the left cavity 26. The first cable 31 is wrapped around the right axis of the wheel assembly 35. The second cable 32 is wrapped around the left axis of the wheel assembly 35. As a result, an enclosed loop is formed by the first cable 31, the wheel assembly 35, the second cable 32, and the main body 2. This enables a user to put the electronic device on a hook of wall or on the neck for hanging. This thus does not need to wrap cables 31 and 32 around the electronic device or detach the speakers 33 and 34 from same. As a result, it is possible of preventing the cables 31 and 32 and the speakers 33 and 34 from being damaged.

Referring to FIGS. 2 and 3 again, in the preferred embodiment the main body 2 further comprises left and right upper holes 20 each provided adjacent the corresponding groove 24. The cables 31 and 32 are adapted to pass the holes 20 to extend a predetermined distance toward the bottom of the main body 2.

Referring to FIG. 3 again, in the preferred embodiment the main body 2 further comprises a circuit board 280. The circuit board 280 comprises a first contact 281 and a second contact 282. The first contact 281 is attached to one end of the first cable 31. The second contact 282 is attached to one end of the second cable 32. The first and the second contacts 281 and 282 are adapted to transmit an audio signal to the first cable 31 and the second cable 32 respectively. The audio signals are then transmitted to the speakers 33 and 34. Finally, sound is amplified by the speakers 33 and 34.

Figure 4:
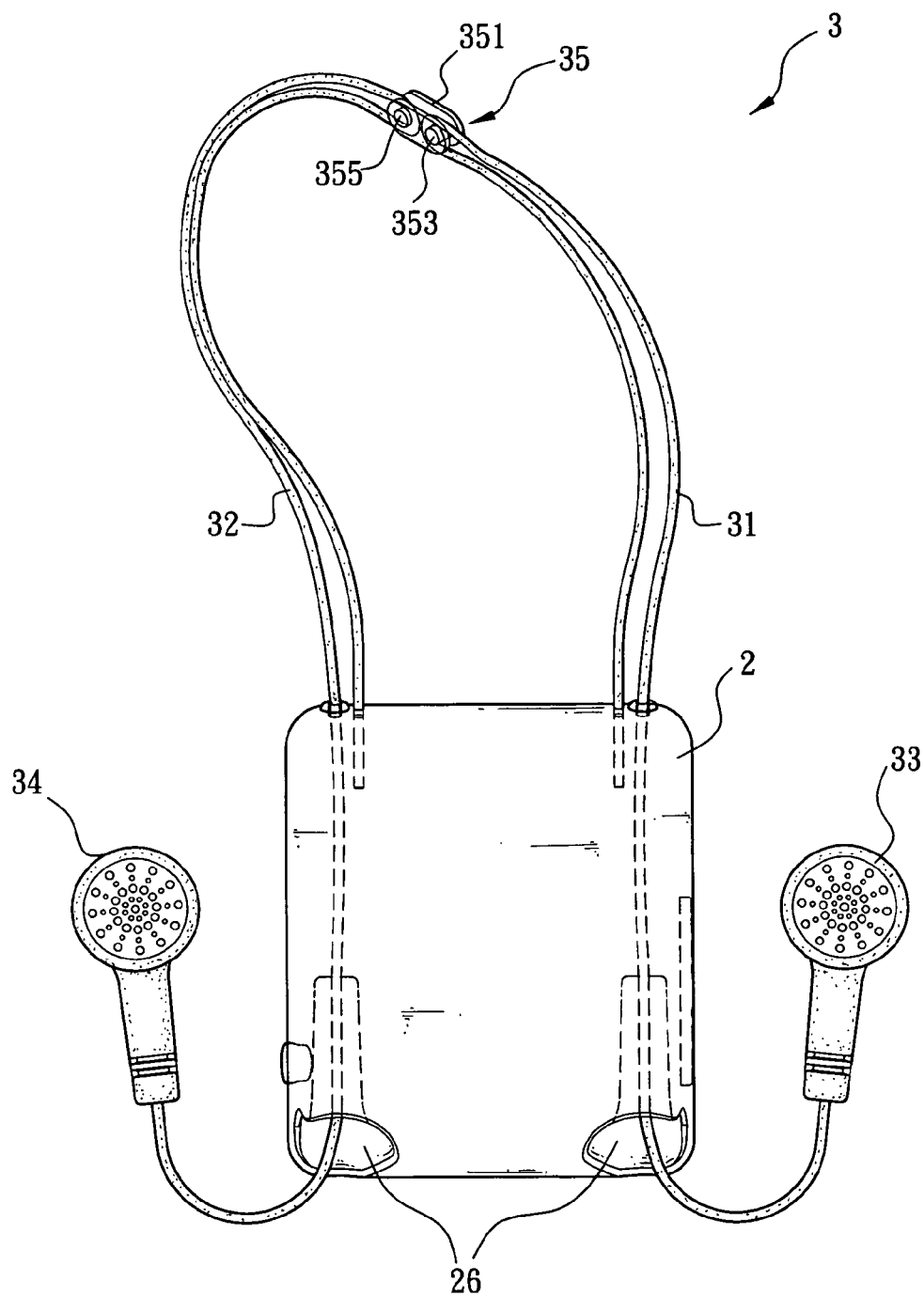
FIG. 4 is a view similar to FIG. 2 where the speakers are extended.

Referring to FIG. 4 in conjunction with FIG. 2, in the preferred embodiment the wheel assembly 35 comprises two plates 351, a first axis 353, and a second axis 355. Two ends of the first axis 353 are provided at a left side of the plates 351. Two ends of the second axis 355 are provided at a right side of the plates 351. Thus, the first cable 31 may pass one ends of the plates 351, pass a gap between the plates 351, wrap around the first axis 353, and leave one ends of the plates 351. Similarly, the second cable 32 may pass the other ends of the plates 351, pass the gap between the plates 351, wrap around the second axis 355, and leave the other ends of the plates 351. As a result, an enclosed loop is formed by the first cable 31, the wheel assembly 35, the second cable 32, and the main body 2. This enables a user to put the electronic device on a hook of wall or on the neck for hanging.

Referring to FIG. 2 again, by configuring as above, the speakers 33 and 34 are protected when the speakers 33 and 34 are received in the cavities 26. Also, an enclosed loop is formed by the cables 31 and 32, the wheel assembly 35, and the main body 2 for enabling a user to put the electronic device on a hook of wall or on the neck for hanging. Pulling the speakers 33 and 34 out of the cavities 26 will shorten lengths of the cables 31 and 32 extended from the top of the main body 2 as shown in FIG. 4. Thus, a user may put the speakers 33 and 34 into the ears for listening. Also, the user may pull either the first cable 31 and/or the second cable 32 to adjust the position of the wheel assembly 35. The wheel assembly 35 thus moves toward one ends of the cables 31 and 32 and thus the cables 31 and 32 and the main body 2 are neatly disposed. As a result, the prior drawbacks of damage and being messy or entangled of the cables and the speakers are substantially eliminated.

While the invention herein disclosed has been described by means of specific embodiments, numerous modifications and variations could be made thereto by those skilled in the art without departing from the scope and spirit of the invention set forth in the claims.

What is claimed is:

1. A wireless electronic device comprising:
a main body, wherein the main body comprises:
two side grooves each having one end provided at the other side of the main body and the other end provided adjacent to one side of the main body by extending within the main body wherein one pair of ends of an earphone assembly pass the grooves to terminate at one side of the main body; and
two cavities each having one end attached to the other end of the corresponding groove and the other end terminated at one side of the main body wherein the cavities are adapted to receive the pair of ends of the earphone assembly; and
the earphone assembly further being retractably disposed in the main body with two ends provided at one side of the main body capable of being pulled outward and a cable portion between the two ends adapted to extend through the other side of the main body to form an enclosed loop, wherein the earphone assembly comprises:
a first cable having one end fastened in the main body and the other end extended beyond the main body, passed the other groove, and terminated at the other cavity;
a second cable having one end fastened in the main body and the other end extended beyond the main body, passed one groove, and terminated at one cavity;
a first speaker being retractably disposed in the other cavity and having one end attached to the other end of the first cable;
a second speaker being retractably disposed in one cavity and having one end attached to the other end of the second cable; and
a wheel assembly having one end movably disposed between two ends of the first cable and the other end movably disposed between two ends of the second cable so as to together with the cables and the main body form an enclosed loop.

2. The wireless electronic device of claim 1, wherein the wheel assembly comprises:
   two plates;
   a first axis having two ends provided at one side of the plates such that the first cable is adapted to pass one ends of the plates, pass a gap between the plates, wrap around the first axis, and leave one ends of the plates; and
   a second axis having two ends provided at the other side of the plates such that the second cable is adapted to pass the other ends of the plates, pass the gap between the plates, wrap around the second axis, and leave the other ends of the plates.

3. The wireless electronic device of claim 1, wherein the main body further comprises a first upper hole and a second upper hole each provided adjacent the corresponding groove, and wherein the first and the second cables are adapted to pass the first and the second upper holes to extend a predetermined distance toward one side of the main body.

4. The wireless electronic device of claim 3, wherein the main body further comprises a circuit board including:
   a first contact attached to one end of the first cable and adapted to transmit a first audio signal to the first cable; and
   a second contact attached to one end of the second cable and adapted to transmit a second audio signal to the second cable.

* * * * *